Oct. 8, 1940.   C. J. R. H. VON WEDEL   2,216,993

LIGHT PROJECTION SYSTEM

Filed Oct. 1, 1937

INVENTOR:—
CARL J. R. H. VON WEDEL
BY Charles T. Jacoby,
ATTORNEY.

UNITED STATES PATENT OFFICE 2,216,993

LIGHT PROJECTION SYSTEM

Carl J. R. H. von Wedel, West Orange, N. J.

Application October 1, 1937, Serial No. 166,783

4 Claims. (Cl. 88—24)

This invention relates to light projection systems, and more particularly to systems such as searchlight or spotlight systems for the projection of defined beams. An especial aspect of the invention relates to the projection of light beams for the proper illumination of small objects, such as small prints or transparencies to be enlargedly projected as by suitable objective lenses.

It is an object of my invention to provide a generally improved system of the class described.

It is another object to provide such a system of improved efficiency.

It is another object to provide such a system efficiently yielding a beam of improved homogeneity, or uniformity in its several sectional portions.

It is another object to provide such a system which is especially adapted to the projection of a highly concentrated beam, and to the proper illumination of small objects.

It is another object to provide such a system which will be compact and inexpensive.

It is another object to reduce the heat radiation to the object to be illuminated.

Other and allied objects will more fully appear from the following description and the appended claims.

Figure 1:
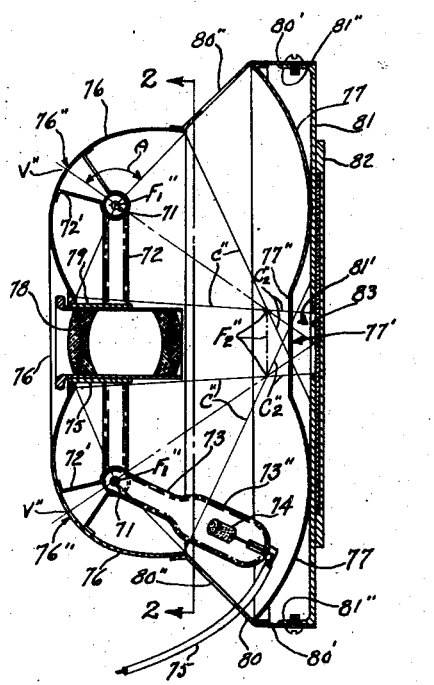
Figure 2:
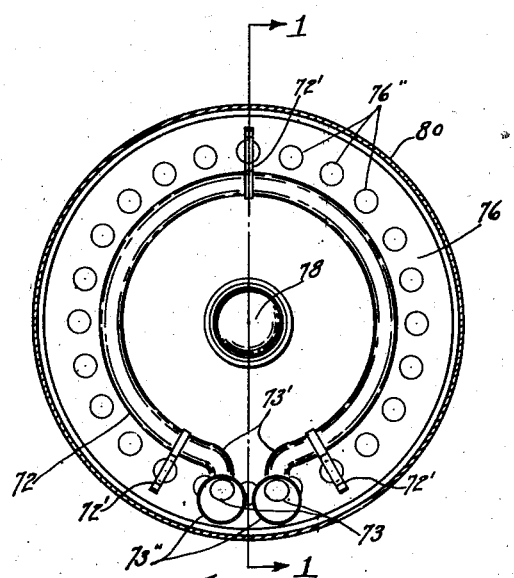

In the description of my invention, hereinafter set forth, reference is had to the accompanying drawing, of which:

Figure 1 is a cross-sectional view of a projection system embodying my invention in a typical form; and Figure 2 is a cross-sectional view taken along the line 2—2 of Figure 1 (Figure 1 being taken along the line 1—1 of Figure 2).

In embodying my invention I employ with the light source a main reflecting means having a cross-section substantially of partial elliptical form, and having a vertex behind and a nearer focus within the source, so that there is projected a beam of light convergent substantially at the further focus of the reflecting means. Preferably the extension of this reflecting means, as measured angularly about the focus $F_1''$ (e. g., by the arc A, Figure 1) at least of the order of 90 degrees; this causes the beam to include at least substantially all the radiation extending rearwardly (i. e., having a rearward component) from the source.

With various forms of main reflecting means behind a light source there have been employed auxiliary reflecting means forward of the source, these having in certain cases been of circular cross-section about the source as a center. I have found, however, that these means are of peculiar value in combination with such a main reflecting means as I have described—for, in view of the convergence of the beam from the main reflecting means, the auxiliary reflecting means may be extended in a central direction materially closer to the major axis of the main reflecting means than does the edge or periphery of the latter, thus capturing an especially large fraction of the forwardly extending radiation. This of course it redirects rearwardly approximately to the nearer focus, for effective addition to the utilized rearward radiation from source to main reflecting means.

The light-utilization means I may place in front of the further focus abovementioned, so that the beam is utilized after it has passed that focus and become a divergent beam. The light-utilization means will therefore be related to the virtual light source provided at the further focus, as it might be to an actual light source placed at that focus—but with many salient advantages over the latter arrangement, including the interception by the light utilization means of substantially the entire radiation from the source actually employed instead of only a minor fraction, freedom from limitation as to proximity of the light utilization means to the further focus (of peculiar value in cases of a small ultimate beam), etc.

The main reflecting means having a cross-section of partial elliptical form, and the auxiliary reflecting means having a cross-section of partial circular form, have been embodied in the construction of Figures 1 and 2. Herein the main reflecting means 16 is in the form of a partial ellipsotoroid (of angular extension about the vertex $V''$, as measured by the angle A, of the order of 100 degrees, and of eccentricity about .6, for example) and the auxiliary reflecting means is in the form of a partial simple toroid—i. e., each has the respectively specified cross-section in two complimentary positions in each of an infinite number of planes containing (rotated about) a common central line. In this case the nearer and further foci, $F_1''$ and $F_2''$, respectively, each becomes in its entirety a circle rather than a point, the circular focus $F_1''$ nearer the main means 16 being of course the center of the partial circular cross-section of the auxiliary means 17. The light source in such a case, disposed to coincide with or include the circular focus $F_1''$, is appropriately of substantially circular form, such as the luminous column 71 of a circularly shaped mercury or other metal vapor or gas discharge lamp 72.

It will be understood that by this arrangement there is propagated a light beam in the form of a prism longitudinally curved into circular form, the convergence of the beam being substantially at the further circular focus $F_2''$; this beam has been indicated in the cross-sectional view of Figure 1 by the two sets of limiting rays $C''$. In order to concentrate the entire beam in one region the cross-section of the main reflecting means 76 may be arranged so that the further circular focus $F_2''$ is of small diameter relative to the nearer circular focus $F_1''$—e. g., the major axis $F_1''$—$F_2''$ of the partial elliptical cross-section may be established as a cone convergent somewhat forward of or beyond the further focus $F_2''$. Accordingly a little forward of the latter focus the there-diverging beam (indicated by the two sets of limiting rays $C_2''$) will spread through a common, restricted space, in which may be placed a print or the like 83 to be illuminated. The print (which may if desired be of large size to contain many areas to be selectively illuminated) may be retained as by movable retaining means 82 against the forward face of a vertical plate 81, to expose through a small central aperture 81' in the latter the particular area to be projected. The auxiliary reflecting means, which may be located just behind this plate 81, may extend only outside of the conical major axis $F_1''$—$F_2''$ of 76; its central portion, through which the restricted beam must pass (e. g., the beam represented by the limiting rays $C_2''$), may be flattened as at 77'' and provided with the small aperture 77'. While its efficiency tends to be halved (relative to that of the auxiliary reflecting means which extend on both sides of the major axis of a main reflecting means) by its extension on only one side of (i. e., outside only, and not inside) the conical axis $F_1''$—$F_2''$, its efficiency in the extension on that one side is preserved at a high level by its far closer approach to the major axis $F_1''$—$F_2''$ than that of the periphery of the main reflecting means 76.

By way of example the plate 81 may be of circular form and provided with the rearwardly extending flange 81''; to this may be secured the cylindrical portion 80' of a generally ring-shaped member 80, within which the periphery of the auxiliary reflecting means 77 may be secured. The ring-shaped member 80 may be conically reduced in diameter as it passes rearwardly, and to it at its rearward extremity may be secured the periphery of the main reflecting means 76. Passing through the center of the latter may be secured the lens mount 79, in which there may be slidably retained (as for focussing) the objective lens 78 for rearward enlarged projection of the print 83.

The tubular discharge device 72, which may be secured in suitable relationship to 76 as by brackets 72', may by way of example be of tubing of the order of 5 or 6 mm. diameter, filled with a neon-helium mixture at a pressure of the order of 12 to 14 mm. Hg, and may contain a drop of mercury for vaporization. The tubing may be bent at the two adjacent regions 73' to provide the forward extensions 73, respectively terminating in the enlarged portions 73''; in the latter may be sealed respective electrodes 74, for example of a thermionic type adapted to be maintained emissive by the arc discharge between the electrodes, and connected by leads 75 through a suitable ballast (not shown) to a current source. The column 71 of the discharge may or may not concentrate materially within the cross-section of the device 72, as desired and depending on the temperature attained by 72. To aid in the establishment of a desired operating temperature therefor, the main reflecting means 76 may be provided with a series of holes 76'' centered for example along the base of the conical major axis $F_1''$—$F_2''$ and thus in a position not interfering with the desired reflection by 76; and the ring-shaped member 80 may be provided in its conical portion with a series of holes 80'', co-operating with the holes 76'' to provide suitable air circulation. Purely by way of example, I may mention the selection of the ballast and other constants to produce a power dissipation in the column 71 of the order of 80 to 100 watts.

It will be appreciated that the light source means 71 may be considered as providing an effective plurality of light sources in circular arrangement; the reflecting means and their foci as made up of a number of side-by-side reflecting means and foci for the several sources; and the total beam as made up of a corresponding number of individual beams—all of which will strike the print from a different direction, which fact, coupled with the certainty of non-coincidence of any imperfections in the homogeneity of the individual beams, insures a substantial uniformity of print illumination without reliance on diffusing means. The particularly illustrated structure amounts to a simple embodiment of the arrangements just reviewed. In general, it will be obvious that the details of the illustrated embodiment may be varied within wide limits without necessarily departing from the spirit of the invention or from its scope as defined in the appended claims.

I claim:

1. In combination, an annular light source; partial ellipso-toroidal reflecting means having an annular vertex behind and a nearer annular focus within said source, and having extensions from said vertex as measured angularly about said focus at least of the order of 90 degrees, for projecting a beam of light substantially convergent at and divergent forward of the further focus of said means; light-utilization means disposed forward of said further focus to receive said beam as a divergent beam therefrom; and partial toroidal reflecting means disposed forward of and cross-sectionally centered about said nearer focus for reflecting therethrough light passing forwardly from said source.

2. In combination, source means providing an effective plurality of light sources in substantially circular arrangement; reflecting means, cross-sectionally of partial elliptical form and having vertices behind and nearer foci within said sources and having extensions from said vertices as measured angularly about said foci at least of the order of 90 degrees, for projecting beams of light substantially convergent at and divergent forward of the further foci of said reflecting means, said reflecting means being disposed to cause a substantially circular arrangement of said further foci; light-utilization means disposed forward of said further foci to receive said beams as divergent beams therefrom; and reflecting means, disposed forward of said nearer foci and cross-sectionally of partial circular form about said nearer foci as centers, for reflecting therethrough light passing forwardly from said sources.

3. In combination, source means providing an effective plurality of light sources in substantially circular arrangement; reflecting means, in cross-section substantially of partial elliptical form and having vertices behind and nearer foci within said sources, for projecting beams of light substantially convergent at and divergent forward of the further foci of said reflecting means, said reflecting means being disposed to cause a substantially circular arrangement of said further foci; light-utilization means disposed forward of said further foci to receive said beams as divergent beams therefrom; and reflecting means, disposed forward of said nearer foci, and in cross-section substantially of partial circular form about said nearer foci as centers, for reflecting therethrough light passing forwardly from said sources.

4. In combination, source means providing an effective plurality of light sources in substantially circular arrangement; reflecting means, in cross-section substantially of partial elliptical form and having vertices behind and nearer foci within said sources, for projecting beams of light substantially convergent at and divergent forward of the further foci of said reflecting means, said reflecting means being disposed to cause a substantially circular arrangement of said further foci; means for holding an object to be illuminated, disposed forward of said further foci so that the object receives said beams as divergent beams from said further foci; and an objective lens substantially centered between said plurality of light sources for projecting light reflected rearwardly by the object from said divergent beams.

CARL J. R. H. von WEDEL.